Sept. 4, 1962  E. W. SAMBURSKY  3,052,345
LUNCH BUCKET
Filed April 13, 1959
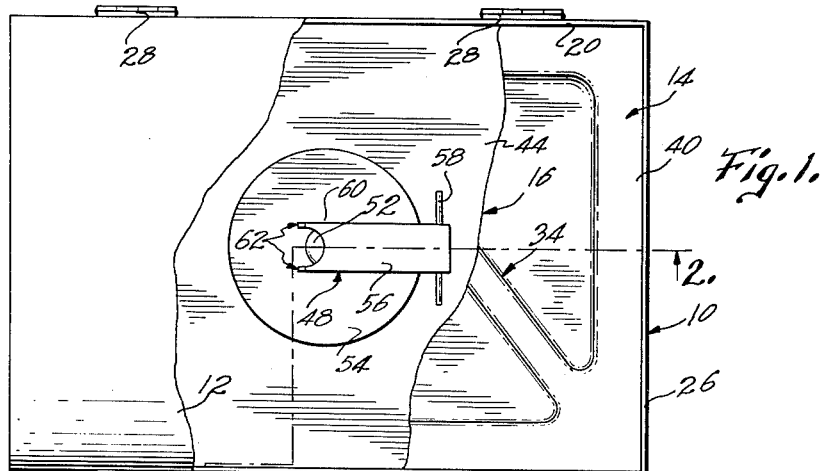
Fig. 1.
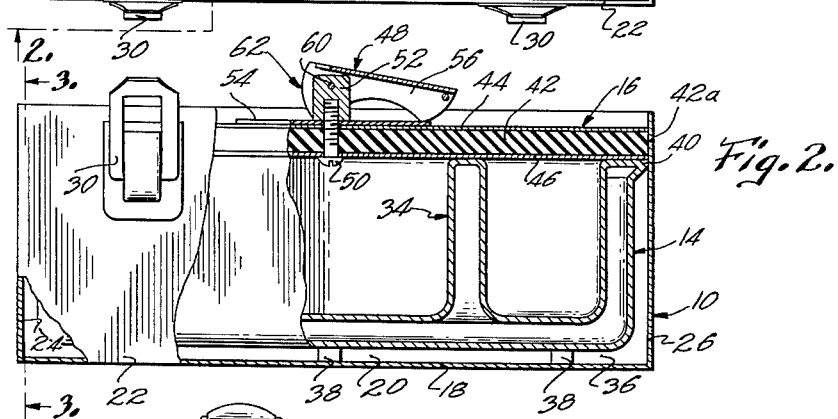
Fig. 2.
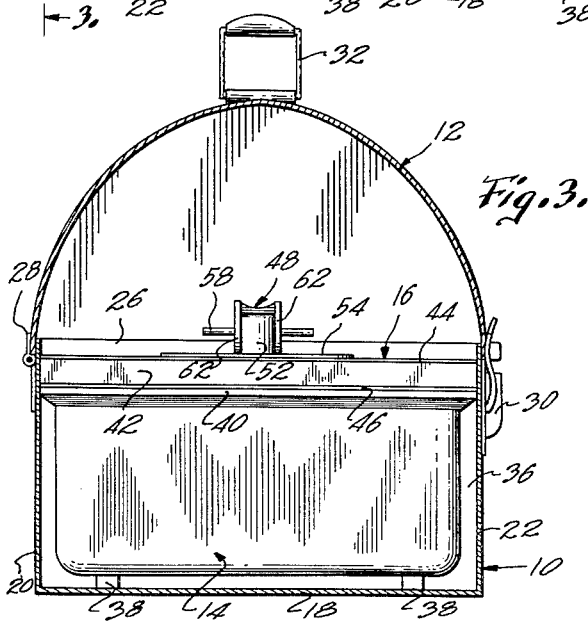
Fig. 3.
INVENTOR.
Ezra W. Sambursky
BY 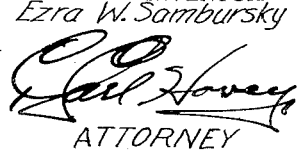
ATTORNEY 3,052,345
LUNCH BUCKET
Ezra W. Sambursky, 2403 N. Wabash, Kansas City, Mo.
Filed Apr. 13, 1959, Ser. No. 805,759
1 Claim. (Cl. 206—4)

This invention relates to an improved lunch bucket and has for its primary object the provision of efficient means for maintaining foods hot or cold, as may be desired, through the provision of novel insulating and sealing means.

It is the most important object of the present invention to provide a lunch bucket that includes a food container within a case spaced from the walls of the latter to provide dead-air insulation therearound, and of double-wall construction to provide vacuum insulation, all in combination with a novel cover for the container which serves the dual purpose of sealing the food within the container and sealing off the insulation space around the container.

In the drawing:

FIG. 1 is a plan view of a lunch bucket made pursuant to my present invention, parts being broken away and in section to reveal details of construction.

FIG. 2 is a fragmentary, cross-sectional view taken on irregular line 2—2 of FIG. 1 with the lid of the case entirely removed; and FIG. 3 is a cross-sectional view taken on line 3—3 of FIG. 2.

The lunch bucket illustrated in the drawing is composed of three primary parts, namely, an open top case 10, having a lid 12, an open top food container 14 within the case 10, and a cover 16 within the case 10 for the container 14.

Case 10 includes a bottom 18, a pair of side walls 20 and 22, and a pair of end walls 24 and 26.

Lid 12 is attached to the side wall 20 through the medium of hinges 28, and suitable clasps 30 are provided to releasably attach the lid 12 to the wall 22. A handle 32 on the lid 12 facilitates carrying.

Container 14 is of double-wall construction throughout to provide vacuum insulation, and one or more partitions 34 subdivide the container 14 into a plurality of food-receiving compartments. While container 14 is of substantially the same shape as the case 10, it is of smaller dimensions so as to provide a dead-air insulation space 36 therearound, and to provide room for the cover 16 as is best illustrated in FIG. 2. To the end that the container 14 is maintained in spaced relationship to the bottom 18, a plurality of spacers 38 are interposed between the container 14 and the bottom 18, such spacers being preferably made from a material that will not readily conduct heat or cold. A continuous outturned, peripheral flange 40 at the uppermost edge of the container 14, integral therewith, bears against the walls 20, 22, 24 and 26 of the case 10 to maintain the space 36 around the container 14.

Cover 16 includes a resilient sealing member 42 in the nature of a flat, polygonal panel such as rubber, whose dimensions are normally substantially the same as case 10 so that cover 16 can be readily inserted thereinto and removed. The member 42 is embraced by a pair of similarly shaped plates 44 and 46 of essentially rigid material, it being noted however, that the peripheral, rectangular edge 42a of the member 42, protrudes beyond the proximal edges of the plates 44 and 46. Consequently, the maximum dimensions of the plates 44 and 46 are less than the case 10.

Releasable means 48 is provided in the cover 16 to apply pressure to the member 42 and to maintain such pressure so as to expand the peripheral edge 42a against the walls 20, 22, 24 and 26 of the case 10 and to hold such edge 42a in engagement with said walls. The releasable means 48 includes a centrally disposed bolt 50 traversing the plates 44 and 46 and the member 42, and provided with a nut 52 which bears against a reinforcing disc or wear plate 54 interposed between nut 52 and plate 44 and, if desired, attached to the latter.

A trigger 56, having a handle 58 at one end thereof, is transversely U-shaped and embraces the nut 52, a pivot pin 60 swingably mounting the trigger 56 on the nut 52. A pair of cam edges 62 on the trigger 56 slide along the disc 54 as the trigger 56 is swung about the pivot pin 60 through use of handle 58.

In order to remove the cover 16 from within the case 10, it is but necessary to pull upwardly on the handle 58, thereby swinging the trigger 56 anticlockwise, viewing FIG. 2. This releases the pressure on the member 42 by virtue of the fact that the plates 44 and 46 are permitted to move apart and upon such release of pressure, the tight engagement of the peripheral edge 42a, with the walls 20, 22, 24 and 26, is likewise released.

After the cover 16 is reinserted into the case 10 with the plate 46 bearing tightly against the upper edge of the container 14 and, therefore, the upper edges of the partitions 34, the operator need merely swing the trigger 56 back to the position shown in the drawing to again clamp the cover 16 tightly within the case 10. It is seen that such swinging of the trigger 56 downwardly and inwardly toward the plate or disc 54, draws the plates 44 and 46 toward each other, applying pressure to the resilient member 42. This causes the member 42 to expand outwardly in all directions until its peripheral edge 42a tightly engages the walls 20, 22, 24 and 26. Such tight engagement not only holds the cover 16 in place, closing and sealing the various compartments of the container 14, but seals the dead-air space 36, obviating any movement of air to or from the space 36 past the peripheral edge of the flange 40. Consequently, there is no air transfer between the space 36 and the compartments of the container 14, or between the space 36 and the interior of the lid 12.

It can now be appreciated that foods of various temperatures may be placed in the compartments of the container 14 and there will be little, if any, heat transfer therebetween.

The tightness of fit of the cover 16 within the case 10 may be adjusted by simply rotating the trigger 56 when released to in turn rotate the nut 52 with respect to bolt 50, thereby varying the distance between the plates 44 and 46 when the same are in clamped relationship to the resilient member 42.

Having thus described the invention what is claimed as new and desired to be secured by Letters Patent is:

In a lunch bucket, an open top case having a bottom, a pair of flat side walls and a pair of flat end walls; a one-piece, open top food container in said case having closed, double wall construction to provide vacuum insulation, said container having an outwardly extending peripheral flange therearound at the top there of engaging the inner surfaces of the walls of the case, said container being formed to include partition means of said closed, double wall construction for separation of the container into compartments; a plurality of spacers of relatively thermal nonconductive material disposed between said bottom and the container, said spacers cooperating with the flange to maintain the container spaced from the bottom and the walls of the case to provide dead-air insulation therearound; and a cover for the container in the case, said cover including a relatively thick, flat, resilient member completely overlying the open top of the container, a continuous peripheral edge extending proximal the inner surfaces of the walls of the case, a pair of relatively rigid plates embracing the member on opposite sides of the latter, means extending through the member releasably interconnecting the plates, and a lever swingably mounted on the releasable means and having a cam surface thereon slidably engageable with one of the plates when the lever is swung in one direction to force said one plate toward the other plate to squeeze the edge of the member into fluid-tight sealing engagement with the inner surface of said walls, both of said plates being substantially co-extensive with said member, the other of said plates engaging the upper edge of the walls of the container and the partition when said cover is in sealing position on the container.

References Cited in the file of this patent

UNITED STATES PATENTS

| | | |
|---|---|---|
| 2,731,996 | Hayes | Jan. 24, 1956 |
| 2,761,552 | Levine | Sept. 4, 1956 |

FOREIGN PATENTS

| | | |
|---|---|---|
| 501,102 | Italy | Nov. 23, 1954 |
| 506,538 | Canada | Oct. 12, 1954 |
| 1,055,504 | France | Oct. 14, 1953 |